(12) United States Patent
Martin et al.

(10) Patent No.: US 10,718,250 B2
(45) Date of Patent: Jul. 21, 2020

(54) METHOD TO LIMIT TEMPERATURE INCREASE IN A CATALYST AND DETECT A RESTRICTED EXHAUST PATH IN A VEHICLE

(71) Applicant: Ford Global Technologies, LLC, Dearborn, MI (US)

(72) Inventors: Douglas Raymond Martin, Canton, MI (US); William David Treharne, Ypsilanti, MI (US); Matthew D. Smith, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 544 days.

(21) Appl. No.: 15/344,776

(22) Filed: Nov. 7, 2016

(65) Prior Publication Data
US 2017/0051653 A1 Feb. 23, 2017

Related U.S. Application Data

(62) Division of application No. 13/597,907, filed on Aug. 29, 2012, now Pat. No. 9,527,498.

(51) Int. Cl.
*F02N 11/00* (2006.01)
*F01N 11/00* (2006.01)
(Continued)

(52) U.S. Cl.
CPC ............. *F01N 11/00* (2013.01); *B60W 20/00* (2013.01); *B60W 20/16* (2016.01); *F02D 17/04* (2013.01);
(Continued)

(58) Field of Classification Search
CPC ...... F02D 29/02; F02D 41/22; F02D 41/1497; F02D 17/04; F02D 2200/1004;
(Continued)

(56) References Cited

U.S. PATENT DOCUMENTS

| 4,542,727 A | 9/1985 | Britsch et al. |
| 5,044,195 A * | 9/1991 | James ................. F02D 41/1497 |
| | | 73/114.05 |

(Continued)

FOREIGN PATENT DOCUMENTS

| CN | 102072818 A | 5/2011 |
| CN | 102374094 A | 3/2013 |

OTHER PUBLICATIONS

Chinese Office Action for Application No. 201310385128, dated Oct. 9, 2016, 16 pages.

*Primary Examiner* — David Hamaoui

(74) *Attorney, Agent, or Firm* — Brooks Kushman P.C.; David B. Kelley

(57) ABSTRACT

A vehicle has an engine, an exhaust aftertreatment system, an electric machine, and a controller configured to, in response to an actual engine torque output being less than an inferred engine torque, shut down the engine. A vehicle has an engine, an exhaust aftertreatment system, an electric machine, and a controller configured to, in response to an actual engine torque output being less than a first threshold and a torque request to the engine being greater than a second threshold, set a diagnostic code. A method includes receiving an actual engine torque output, receiving an engine torque request, and shutting down the engine when the actual engine torque output is less than a first threshold and the engine torque request is greater than a second threshold for a predetermined time period to limit temperature increase of a catalyst.

11 Claims, 3 Drawing Sheets

(51) Int. Cl.
*F02D 41/14* (2006.01)
*F02D 41/22* (2006.01)
*F02D 17/04* (2006.01)
*F02D 29/02* (2006.01)
*B60W 20/16* (2016.01)
*B60W 20/00* (2016.01)

(52) U.S. Cl.
CPC ......... *F02D 29/02* (2013.01); *F02D 41/1497* (2013.01); *F02D 41/22* (2013.01); *B60W 2710/0694* (2013.01); *F02D 2200/1002* (2013.01); *F02D 2200/1004* (2013.01)

(58) Field of Classification Search
CPC .......... F02D 2200/1002; B60W 20/16; B60W 20/00; B60W 2710/0694; F01N 11/00
See application file for complete search history.

(56) References Cited

U.S. PATENT DOCUMENTS

| | | | |
|---|---|---|---|
| 5,505,177 A | 4/1996 | Herdin et al. | |
| 5,515,281 A | 5/1996 | Palazzetti et al. | |
| 6,494,277 B1 * | 12/2002 | Boggs | B60K 6/48 180/65.25 |
| 6,520,159 B2 | 2/2003 | White et al. | |
| 6,962,224 B2 | 11/2005 | Nakanowatari | |
| 7,234,446 B2 | 6/2007 | Toyoda | |
| 7,251,990 B2 | 8/2007 | Taglialatela-Scafati et al. | |
| 7,606,652 B2 * | 10/2009 | Kaiser | F02D 11/105 701/102 |
| 7,832,198 B2 | 11/2010 | Okubo et al. | |
| 8,050,841 B2 * | 11/2011 | Costin | F02D 41/0087 123/399 |
| 8,215,424 B2 | 7/2012 | Kaita | |
| 8,607,565 B2 * | 12/2013 | Sato | F02B 37/18 60/602 |
| 8,820,051 B2 * | 9/2014 | Barasa | F01N 3/0253 60/286 |
| 8,910,466 B2 * | 12/2014 | Kowalkowski | F01N 3/023 60/276 |
| 2003/0173123 A1 * | 9/2003 | Nakanowatari | B60K 6/44 180/65.225 |
| 2005/0262827 A1 | 12/2005 | Ichimoto et al. | |
| 2011/0139524 A1 | 6/2011 | Heinrich et al. | |
| 2012/0204539 A1 | 8/2012 | Gonze et al. | |
| 2013/0190962 A1 | 7/2013 | Yokouchi et al. | |

* cited by examiner

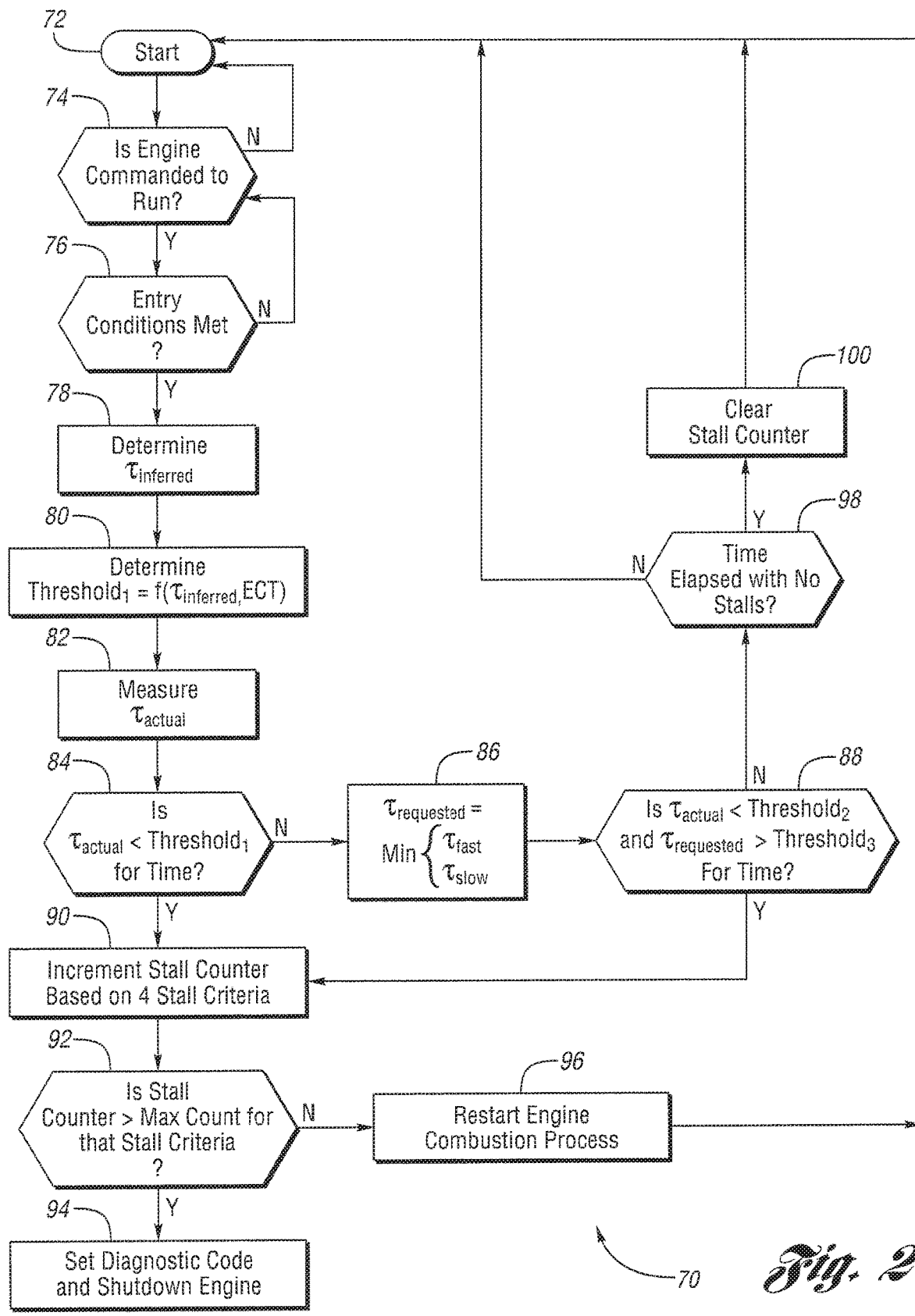

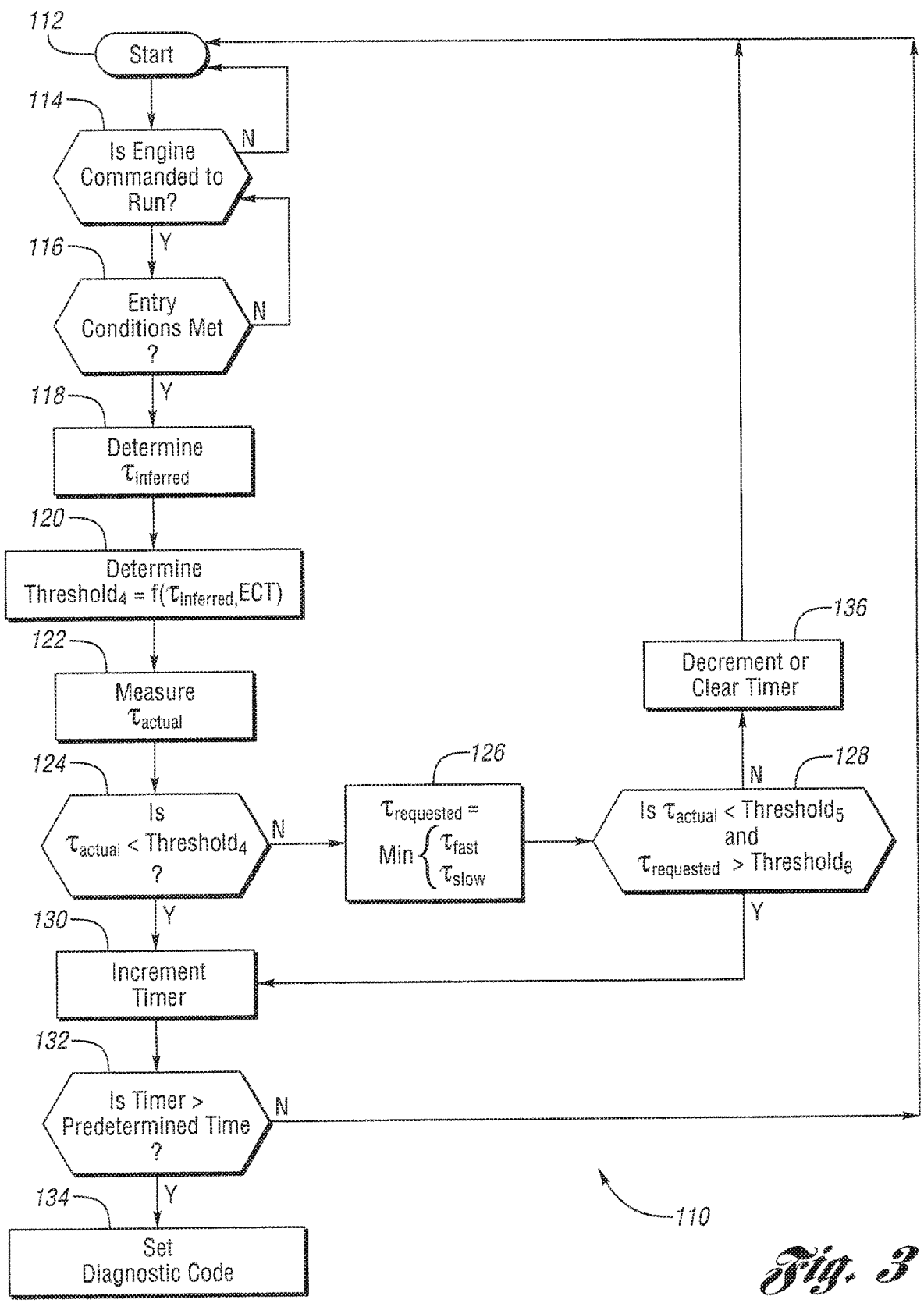

METHOD TO LIMIT TEMPERATURE INCREASE IN A CATALYST AND DETECT A RESTRICTED EXHAUST PATH IN A VEHICLE

CROSS-REFERENCE TO RELATED APPLICATIONS

This application is a division of U.S. application Ser. No. 13/597,907 filed Aug. 29, 2012, now U.S. Pat. No. 9,527,498, the disclosure of which is hereby incorporated in its entirety by reference herein.

TECHNICAL FIELD

Various embodiments relate to monitoring engine conditions to limit a temperature increase in a catalyst or to detect restricted airflow in an exhaust aftertreatment system in a vehicle, including a hybrid electric vehicle (HEV).

BACKGROUND

Vehicles with engines require engine exhaust aftertreatment systems to remove unwanted chemicals from the exhaust flow and meet emissions requirements. The engine exhaust aftertreatment system may be a catalytic converter. In the case of a three-way catalytic converter, various amounts of carbon monoxide, unburned hydrocarbons and nitrous oxides are removed from the engine exhaust flow before it exits the vehicle to the environment. Unburned hydrocarbons may include unburned fuel and partially burned fuel. If high levels of unburned hydrocarbons are permitted to reach the catalytic converter, the catalytic converter temperature may increase due to chemical reactions between the unburned hydrocarbons and oxygen caused by the catalyst material. These chemical reactions release heat. The temperature rise in the catalytic converter may lead to catalyst degradation or damage, with the potential for catalyst meltdown, restricted exhaust flow, and catalyst deactivation.

Hybrid vehicles may have electric motors configured to rotate the engine without combustion occurring. This hybrid architecture may allow high levels of unburned hydrocarbons reaching the catalytic converter if the electric motor is rotating the engine while the engine is misfiring, stalling, or complete combustion is otherwise not occurring within a cylinder.

A system and method needs to be provided to monitor the engine and exhaust to detect and/or prevent large amounts of unburned hydrocarbons from reaching the catalytic converter, or to provide a diagnostic code when it does occur.

SUMMARY

In an embodiment, a vehicle is provided with an engine, an exhaust aftertreatment system having a catalyst, an electric machine, and at least one controller. The at least one controller is configured to, in response to an actual engine torque output being less than an inferred engine torque output for a predetermined time period, shut down the engine to limit temperature increase of the catalyst.

In another embodiment, a vehicle is provided with an engine, an exhaust aftertreatment system, an electric machine, and at least one controller. The at least one controller is configured to, in response to an actual engine torque output being less than a first threshold and a torque request to the engine being greater than a second threshold for a predetermined time period, set a diagnostic code to indicate restricted air flow in the aftertreatment system.

In yet another embodiment, a method for controlling an engine is provided. Data indicative of an actual engine torque output is received from an electric machine configured to control the speed of the engine. Data indicative of an engine torque request is received. The engine is shut down when the actual engine torque output is less than a first threshold and the engine torque request is greater than a second threshold for a predetermined time period to limit temperature increase of a catalyst in an engine aftertreatment system Various embodiments according to the present disclosure have associated advantages. For example, torque may be used to determine whether the engine is operating or stalling/misfiring with unburned hydrocarbons being motored to the catalytic converter to detect conditions that may degrade or damage the catalyst and preserve the catalyst. Alternatively, the algorithm may detect conditions showing that the catalyst is degraded or damaged, and an appropriate diagnostic code may be set for a service technician. Detection may be difficult, as the vehicle may continue to meet emissions regulations as the flow over the remaining degraded or damaged catalyst surface area is restricted. Previous monitors were unable to operate unless the catalyst was inactive, could not diagnose low engine power complaints caused by restricted flow through the catalytic converter, and could not detect a throttle stuck in a closed position.

BRIEF DESCRIPTION OF THE DRAWINGS

FIG. 2 is a flowchart depicting an algorithm for detecting a stall condition for a catalyst monitor according to an embodiment; and FIG. 3 is a flowchart depicting an algorithm for detecting a partially blocked exhaust path from a damaged catalyst for a catalyst monitor according to an embodiment.

DETAILED DESCRIPTION

Figure 1:
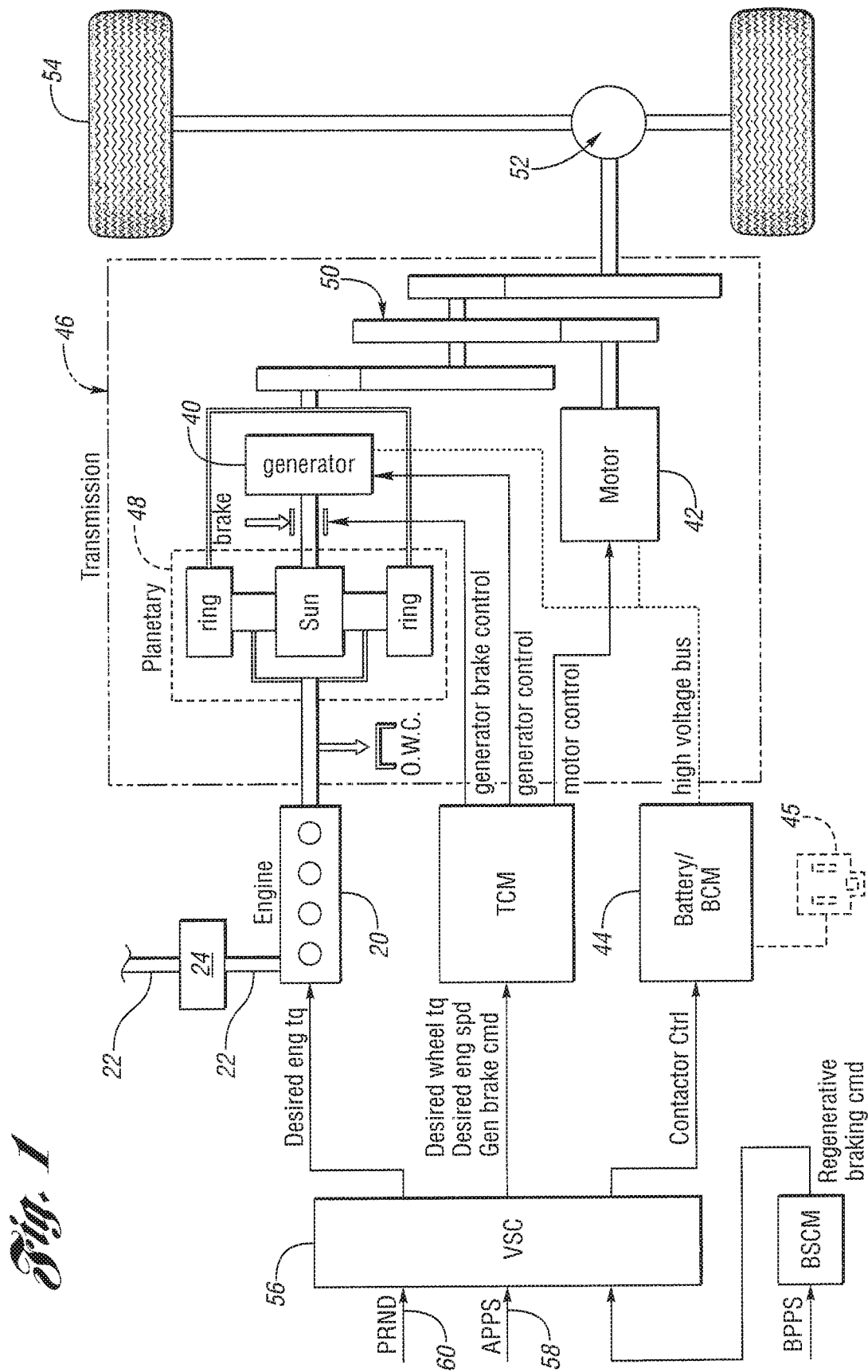
FIG. 1 is a schematic diagram of a hybrid vehicle capable of implementing various embodiments of the present disclosure.

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In FIG. 1, an embodiment of a hybrid electric vehicle (HEV) is shown that may be used with the diagnostic of the present disclosure. Of course, FIG. 1 represents only one type of HEV architecture, and is not intended to be limiting. The present disclosure may be applied to any suitable HEV. Furthermore, the present disclosure may be applied to any conventional vehicle that includes a start motor or other device for rotating the crankshaft when the engine is not operating.

Engine 20 is a primary power source in the HEV configuration of FIG. 1. A secondary power source is a combination of a generator 40, an electric motor 42, and a battery and battery control module 44. The components of the combination are electrically coupled by an electrical high voltage bus. In some embodiments, the battery 44 is additionally rechargeable in a plug-in hybrid electric vehicle (PHEV) configuration using a receptacle 45 connected to the battery 44, possibly through a battery charger/converter unit. The receptacle 45 may be connected to the power grid or other outside electrical power source to charge the battery 44.

The powertrain includes a transmission 46, which comprises a planetary gear unit 48, the generator 40 and the motor 42, as well as torque transfer counter shaft gearing 50. The planetary gear unit 48 comprises a ring gear, a sun gear, a planetary carrier and planet gears rotatably supported on the planetary carrier for engagement with the ring gear and the sun gear. A power output gear element of the gearing 50, is driveably connected to a differential-and-axle assembly 52, which distributes power to vehicle traction wheels 54. In other embodiment, other transmission 46 architectures may be used as are known in the art.

An overall controller for the operating modes of the powertrain may be implemented by a vehicle system controller (VSC) 56, electronic control unit (ECU), or controller, that receives various inputs including driver inputs at 58 and 60. The input at 58 is an accelerator pedal position sensor signal (APPS) and the input at 60 is driver selection for "park," "reverse," "neutral" or "drive range" (PRND).

The engine 20 has an exhaust 22, which flows through an aftertreatment system 24 containing a catalyst, such as a catalytic converter or the like, and to the environment. The catalytic converter 24 contains a substrate which supports a catalyst material as is known in the art. The catalyst material chemically reacts with the exhaust to reduce emissions of unburned hydrocarbons, carbon monoxide, and nitrous oxides.

If the engine 20 stalls, misfires or otherwise has incomplete combustion while being rotated, such as when being spun by the generator 40, an unburned fuel and air mixture flows through the exhaust 22 and to the catalytic converter 24. The temperature in the catalytic converter 24 can rise to the point where the catalyst may melt if the unburned hydrocarbon level is sufficiently high and conditions in the catalytic converter 24 and vehicle are met, i.e. high catalyst temperature. Additionally, if catalyst melting occurs in the catalytic converter 24, an increased back pressure on the engine 20 from exhaust flow restriction may reduce the engine power output. Catalyst degradation, melting, or damage may undetectable using emissions sensors, as the restricted flow over the remaining catalyst material often meets vehicle emissions regulations.

A flow chart illustrating an embodiment of a diagnostic or monitor using algorithm 70 is shown in FIG. 2. The algorithm 70 may detect an engine stall based on actual engine torque, inferred engine torque, and requested engine torque to detect and/or prevent conditions that may damage the catalyst. The algorithm 70 may be implemented by the VSC 56 and use sensor data available to the VSC 56. In one embodiment, algorithm 70 detects conditions that may lead to catalyst damage and operates the vehicle to prevent damage.

The algorithm 70 starts at 72. The controller 56 determines if the engine 20 is being commanded to run or operate at 74. This does not mean that the engine 20 is actually operating and combusting, for example, the engine 20 could be commanded to run but be stalled or misfiring, and not operating correctly.

The algorithm 70 then determines if various entry conditions are met at 76. For example, entry conditions may include the engine 20 not being in secondary idle where the engine is operating in speed control and a torque measurement would not be valid. Another entry condition is the engine 20 not operating in spark retard above a specified torque ratio, i.e. above 50%. Another entry condition is the engine 20 operating without any fuel injectors being cut or disabled, such as when an injector needs replacement, is above a specified temperature, or when an ignition coil needs replacement. Another entry conditions is that the engine 20 is synchronized. When the engine 20 is unsynchronized, the engine 20 position is unknown and needs to be resynchronized, and the entry condition will not be met. All or some of these entry conditions need to be satisfied for algorithm 70 at 76, although the list is not inclusive and other entry conditions as are known in the art may be required.

If the entry conditions are satisfied at 76, the algorithm 70 then determines the inferred torque produced by the engine 20 at 78. The inferred torque is the amount of torque that the engine 20 is expected to produce based on the operating conditions of the engine 20. The inferred torque may be determined as is known in the art, for example as a function of the amount of fuel and air flowing into the engine 20, or using an engine 20 map. The VSC 56 may use measurements from fuel sensors, air sensors, or other engine 20 sensors as required to determine the inferred torque. In one embodiment, the controller 56 maps the inferred torque for the engine 20 from the air and fuel flowing to the engine, the amount of spark retard commanded for the engine, and the speed of the engine. Alternatively, the inferred torque may be available from a controller area network (CAN) in communication with the VSC 56.

The algorithm 70 then determines a threshold, T1, from a calibration table at 80. The calibration table may provide the threshold, T1, as a function of the inferred torque and the engine coolant temperature. A lower engine coolant temperature may desensitize T1.

The algorithm 70 then measures the actual torque produced by the engine 20 at 82. In one embodiment, the actual engine torque output may be mapped using generator 40 current, generator 40 speed, and engine 20 speed in the HEV as disclosed above. Other measurements may also be used to map the actual engine torque output, such as the outer ring speed of the planetary gear unit 48. The actual engine torque output may also be measured using a torque sensor. Other vehicle sensors and vehicle components may be used to determine the actual engine 20 torque output based on the system architecture. The actual engine torque output may be available from the CAN.

The algorithm 70 compares the actual torque produced by the engine 20 to T1 for a specified time at 84. For example, the time may be on the order of one second and be a sustained time. In one embodiment, T1 is on the order of approximately 25-30% of the inferred torque value, meaning that the actual torque output of the engine 20 is much less than what it should be producing based on the inferred torque determined from the engine map. If the actual torque is greater than T1 at 84, the algorithm 70 proceeds to 86 where it determines the requested torque. The requested torque is the torque that the engine 20 is being commanded to produce, and may be available from the CAN. The requested torque is set as the minimum of either the instantaneous (fast) torque or the long term (slow) torque at 86. Fast torque is based on the spark path in the engine 20, and will be reduced for example using spark retard. Slow torque is based on the air path in the engine 20, and will be reduced for example by restricting the air flow.

At 88, the actual torque is compared to a second threshold, T2, and the requested torque from 86 is compared to a third threshold, T3, for a specified time period. In an embodiment, the thresholds, T2, T3, are set values or constants. In one example, T2 is −1 Nm, T3 is 59 Nm, and the time period is forty five seconds sustained. Of course, other values may be used in other embodiments of the disclosure.

If the actual torque is less than T2 and the requested torque is greater than T3 for the specified time at 88, the algorithm 70 proceeds to 90. Alternatively, the algorithm 70 proceeds from 84 to 90 if the actual torque is less than T1 at 84. At 90, the algorithm 70 increments a stall counter based on one of four stall criteria. The stall criteria include: the engine starting while the catalyst is cold, the engine starting while the catalyst is hot, the engine stalling while the catalyst is cold, and the engine stalling while the catalyst is hot. Whether the catalyst is hot or cold is based on a temperature measurement of the catalyst and set temperature ranges for the catalyst. Each stall criteria has a different maximum count value that is associated with the stall counter. For example, the starting cold criteria will have a higher maximum stall count value than the starting hot criteria because the engine 20 may be restarted a larger number of times before unburned hydrocarbons cause the catalytic converter to heat to the point where the catalyst may melt. In one embodiment, the stall criteria is based on the catalyst temperature and the engine start condition, i.e. whether the engine was in a start sequence or had been operating for a time.

At 92, the stall counter is compared to the maximum count value for that stall criteria. If the stall counter is greater than the maximum count value at 92, the algorithm 70 sets a diagnostic code at 94. The algorithm 70 may also cause the controller 56 to send a command to shut down the engine 20 at this time in order to protect the catalyst from potential damage. In some embodiments, the diagnostic code at 94 may cause the vehicle to enter a limited mode of operation, such as a service mode, and may provide a service indicator to the user.

If the stall counter is less than the maximum count value at 92, the engine 20 is commanded to restart the combustion process while the vehicle is operating at 96, and the algorithm 70 then proceeds back to 72.

Referring to 88, if the actual torque is greater than T2 and/or the requested torque is less than T3 for the specified time, the algorithm 70 proceeds to 98. At 98, the algorithm 70 determines if a specified time period has elapsed with no stalls. In one embodiment, the time is thirty seconds. If the specified time has elapsed with no stalls at 98, the stall counter is cleared at 100 and the algorithm 70 returns to 71. If the time has not elapsed without stalls at 98, the algorithm 70 returns to 72.

FIG. 3 illustrates a flow chart of an embodiment of a diagnostic or monitor using algorithm 110. The algorithm 110 may be used to detect a zone where the engine 20 is operating between normal operation/combustion and complete stall to detect and/or prevent conditions that may degrade or damage the catalyst due to unburned hydrocarbons. The algorithm 110 may be implemented by the VSC 56 in conjunction with or independent of algorithm 70 as shown in FIG. 2. In one embodiment, algorithm 110 detects conditions that may confirm existing catalyst degradation or damage where engine power output is limited due to a restricted exhaust flow. For steps similar to those shown in FIG. 2, refer to the discussion above with respect to FIG. 2.

The algorithm 110 starts at 112. The controller 56 determines if the engine 20 is being commanded to run or operate at 114. The algorithm 110 then determines if various entry conditions are met at 116. For example, entry conditions may include the engine 20 not being in secondary idle such that the engine is operating in speed control and a torque measurement is not valid, the engine 20 not operating in spark retard above a specified torque ratio, i.e. above 50%, the engine 20 operating without any fuel injectors being cut or disabled, and that the engine is synchronized. All or some of these entry conditions need to be satisfied for algorithm 110 at 116, although the list is not inclusive and other entry conditions as are known in the art may be required.

If the entry conditions are satisfied at 116, the algorithm 110 then determines the inferred torque produced by the engine 20 at 118.

The algorithm 70 then determines a threshold, T4, from a calibration table at 120. The threshold, T4, may be a function of the inferred torque and the engine coolant temperature. The algorithm 110 then measures the actual torque produced by the engine 20 at 122.

The algorithm 110 compares the actual torque produced by the engine 20 to T4. If the actual torque is greater than T4 at 124, the algorithm 110 proceeds to 126 where it determines the requested torque. The requested torque is the torque that the engine 20 is being commanded to produce. The requested torque is set as the minimum of either the instantaneous (fast) torque or the long term (slow) torque at 126.

At 128, the actual torque is compared to a threshold, T5, and the requested torque from 126 is compared to a threshold, T6. In an embodiment, the thresholds, T5, T6, may be set values or constants. In one example, T5 is 5 Nm, −1 Nm, or −100 Nm, and T6 is 59 Nm. Of course, other values may be used in other embodiments.

If the actual torque is less than T5 and the requested torque is greater than T6 at 128, the algorithm 110 proceeds to 130. Alternatively, the algorithm 110 proceeds from 124 to 130 if the actual torque is less than T4 at 124. In one embodiment, T4 is on the order of approximately 50% of the inferred torque. At 130, the algorithm 110 increments a timer. At 132, the timer is compared to a predetermined time value. In one embodiment, the time value is forty five seconds. If the timer is greater than the time value at 132, the algorithm 110 sets a diagnostic code at 134. If the timer is less than the time value at 132, the algorithm proceeds back to 112.

If the actual torque is greater than T5 and/or the requested torque is less than T6 for the specified time at 128, the algorithm 110 proceeds to 136. At 136, the algorithm 110 decrements or clears the timer, and the algorithm 110 returns to 112.

Various embodiments according to the present disclosure have associated advantages. For example, torque may be used to determine whether the engine is operating or stalling/misfiring with unburned hydrocarbons being motored to the catalytic converter. This allows for detection of conditions that may degrade or damage the catalyst to preserve the catalyst. Alternatively, the algorithm may detect conditions showing that the catalyst is degraded or damaged, and an appropriate diagnostic code may be set for a service technician. Detection may be difficult, as the vehicle may continue to meet emissions regulations as flow over the remaining degraded or damaged catalyst surface area is restricted. Previous monitors were unable to operate unless the catalyst was inactive, could not diagnose low engine power complaints caused by restricted flow through the catalytic converter, and could not detect a throttle stuck in a closed position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
an engine;
an exhaust aftertreatment system having a catalyst;
an electric machine; and
a controller configured to (i) receive a signal indicative of actual engine torque, (ii) in response to the actual engine torque output being less than a first threshold and a requested engine torque being greater than a second threshold, set a diagnostic code indicating restricted air flow across the catalyst, and (iii) in response to the actual engine torque output being less than a third threshold, set the diagnostic code, wherein the first threshold is set as a predetermined constant value, and the second threshold is set as another constant predetermined value, the first threshold being less than the second threshold, and wherein the third threshold is a function of an expected engine torque output and an engine coolant temperature.

2. The vehicle of claim 1 wherein the controller is further configured to set the diagnostic code in response to the actual engine torque output being less than the expected engine torque output.

3. The vehicle of claim 1 wherein the controller is further configured to set the diagnostic code in response to satisfying an entry condition based on an engine state.

4. The vehicle of claim 3 wherein the entry condition is unsatisfied if one of unsynchronized engine operation, spark retard above a predetermined level, a disabled fuel injector and operating in secondary idle is present.

5. The vehicle of claim 1 wherein the controller is further configured to set the third threshold by inputting the expected engine torque output and the engine coolant temperature into a calibration table.

6. The vehicle of claim 2 wherein the controller is further configured to receive a signal from the electric machine indicative of actual engine torque output.

7. The vehicle of claim 1 wherein the controller is further configured to determine the expected engine torque output as a function of air flow, fuel flow, commanded spark retard, and engine speed.

8. The vehicle of claim 1 wherein the controller is further configured to increment a timer in response to the actual engine torque output being less than the first threshold and the requested engine torque being greater than the second threshold, and set the diagnostic code indicating restricted air flow across the catalyst when the timer reaches a predetermined time value.

9. The vehicle of claim 8 wherein the controller is further configured to decrement the timer in response to at least one of the actual engine torque output being greater than the first threshold and the requested engine torque being less than the second threshold.

10. The vehicle of claim 1 wherein the predetermined constant value for the first threshold is a negative torque value, and the another constant predetermined value for the second threshold is a positive torque value.

11. The vehicle of claim 10 wherein the controller is further configured to set the diagnostic code in response to the actual engine torque output being less than the first threshold and the requested engine torque being greater than the second threshold for a predetermined time period, the predetermined time period being a plurality of seconds.

* * * * *